(12) United States Patent
Gong et al.

(10) Patent No.: US 10,106,465 B2
(45) Date of Patent: Oct. 23, 2018

(54) CERAMIC AND PREPARATION METHOD THEREFOR

(71) Applicant: BYD COMPANY LIMITED, Shenzhen (CN)

(72) Inventors: Qing Gong, Shenzhen (CN); Xinping Lin, Shenzhen (CN); Ge Chen, Shenzhen (CN); Yongzhao Lin, Shenzhen (CN); Bo Wu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/533,563

(22) PCT Filed: Nov. 24, 2015

(86) PCT No.: PCT/CN2015/095458
§ 371 (c)(1),
(2) Date: Jun. 6, 2017

(87) PCT Pub. No.: WO2016/091062
PCT Pub. Date: Jun. 16, 2016

(65) Prior Publication Data
US 2017/0327425 A1    Nov. 16, 2017

(30) Foreign Application Priority Data
Dec. 8, 2014 (CN) .......................... 2014 1 0742426

(51) Int. Cl.
*C04B 35/486* (2006.01)
*C04B 35/488* (2006.01)
(Continued)

(52) U.S. Cl.
CPC ............ *C04B 35/48* (2013.01); *C04B 35/486* (2013.01); *C04B 35/488* (2013.01);
(Continued)

(58) Field of Classification Search
CPC ...... C04B 35/48; C04B 35/486; C04B 35/488
See application file for complete search history.

(56) References Cited

U.S. PATENT DOCUMENTS 6,136,232 A * 10/2000 Burlingame ............. H01B 1/08
                                                                 252/518.1
6,669,871 B2 * 12/2003 Kwon ..................... C04B 33/14
                                                                 252/520.21
(Continued)

FOREIGN PATENT DOCUMENTS

CN       101698600 A       4/2010
CN       101704671 A       5/2010
(Continued)

OTHER PUBLICATIONS

The World Intellectual Property Organization (WIPO) International Search Report for PCT/CN2015/095458 dated Feb. 17, 2016 pp. 1-6.

*Primary Examiner* — Karl E Group
(74) *Attorney, Agent, or Firm* — Anova Law Group, PLLC

(57) ABSTRACT

A ceramic and a preparation method therefor are provided. The ceramic includes a zirconia matrix, and an additive dispersed inside and on an outer surface of the zirconia matrix. The additive is an oxide including elements A and B, where A is selected from at least one of Ca, Sr, Ba, Y, and La, and B is selected from at least one of Cr, Mn, Fe, Co, and Ni.

9 Claims, 2 Drawing Sheets

(51) Int. Cl.
    *C04B 35/48*     (2006.01)
    *C04B 35/626*     (2006.01)
    *C04B 35/63*     (2006.01)
    *C04B 35/634*     (2006.01)
    *C04B 35/64*     (2006.01)
    *C04B 35/632*     (2006.01)
    *C04B 35/636*     (2006.01)

(52) U.S. Cl.
    CPC .... *C04B 35/6261* (2013.01); *C04B 35/62655* (2013.01); *C04B 35/632* (2013.01); *C04B 35/6303* (2013.01); *C04B 35/6365* (2013.01); *C04B 35/63408* (2013.01); *C04B 35/63416* (2013.01); *C04B 35/63488* (2013.01); *C04B 35/64* (2013.01); C04B 2235/3208 (2013.01); C04B 2235/3213 (2013.01); C04B 2235/3215 (2013.01); C04B 2235/3225 (2013.01); C04B 2235/3227 (2013.01); C04B 2235/3232 (2013.01); C04B 2235/3243 (2013.01); C04B 2235/3244 (2013.01); C04B 2235/3251 (2013.01); C04B 2235/3268 (2013.01); C04B 2235/3274 (2013.01); C04B 2235/3275 (2013.01); C04B 2235/3279 (2013.01); C04B 2235/3281 (2013.01); C04B 2235/3284 (2013.01); C04B 2235/528 (2013.01); C04B 2235/5436 (2013.01); C04B 2235/5445 (2013.01); C04B 2235/604 (2013.01); C04B 2235/6565 (2013.01); C04B 2235/6567 (2013.01); C04B 2235/9661 (2013.01)

(56) References Cited

U.S. PATENT DOCUMENTS

| | | | | |
|---|---|---|---|---|
| 7,094,718 | B2 * | 8/2006 | Kwon | C04B 33/14 264/604 |
| 7,579,288 | B2 * | 8/2009 | Kwon | C04B 33/14 228/101 |
| 7,833,469 | B2 * | 11/2010 | Swartzlander | C04B 35/486 264/618 |
| 2007/0176332 | A1 * | 8/2007 | Swartzlander | C04B 35/486 264/618 |
| 2014/0011661 | A1 * | 1/2014 | Krstic | C04B 35/486 501/134 |
| 2014/0227654 | A1 * | 8/2014 | Fujisaki | C04B 35/486 433/8 |

FOREIGN PATENT DOCUMENTS

| | | |
|---|---|---|
| CN | 101993248 A | 3/2011 |
| CN | 102066263 A | 5/2011 |
| JP | 2008050246 A * | 3/2008 |

* cited by examiner

CERAMIC AND PREPARATION METHOD THEREFOR

CROSS-REFERENCE TO RELATED APPLICATIONS

This application is a national phase entry under 35 U.S.C. § 371 of International Application No. PCT/CN2015/095458, filed on Nov. 24, 2015, which claims priority to and benefits of Chinese Patent Application Serial No. 201410742426.4, filed with the State Intellectual Property Office of P. R. China on Dec. 8, 2014, the entire content of all of which is incorporated herein by reference.

FIELD OF THE DISCLOSURE

The present disclosure relates to the technical field of materials and, more specifically, relates to a ceramic, a method for preparing a ceramic, and a ceramic prepared by the method.

BACKGROUND

Compared to conventional ceramics, the zirconia ceramic has the characteristics of better corrosion resistance, higher hardness, and higher strength, and thus is widely used. The toughness of the zirconia ceramic can reach up to 5 to 6 MPa $m^{1/2}$. Though the toughness of the zirconia ceramic is higher than that of other conventional ceramics, when fabricated into a large-area exterior part, the zirconia ceramic has the disadvantages of lacking break resistance, having a white color itself, and being too monotonous, etc. However, because the ceramic used as an exterior part needs to simultaneously satisfy the conditions of high toughness, break resistance, and black chromaticity, the existing zirconia ceramic products all fail to meet the requirements of the ceramic to be used in the exterior part. Accordingly, the application of the zirconia ceramic in the exterior part is severely affected.

Because the yttrium-stabilized zirconia powder in the market has been very mature already, the existing toughening technical solutions are all established based on stabilization using yttrium. In the existing toughening technologies, solutions such as the phase transition and the second-phase toughening are most commonly used. However, such solutions are either used only for white ceramics, or fail to achieve the toughening and break-resistant effects when blackening is achieved. For example, though the Mg-stabilized TZP ceramic mentioned in the patent application CN1170787C has a certain degree of toughening effect, the toughening effect is not apparent. Further, the strength of the prepared sample is relatively low and only has a value of approximately 590 MPa, and the large-area exterior part sheet prepared by using a ceramic with such strength is easy to break. Thus, the ceramic with the aforementioned strength can hardly be prepared into a large-area sheet. Further, the ceramic is white, and the application range is also relatively small.

Accordingly, a zirconia ceramic that has excellent properties of high toughness, high break resistance and high blackness and a preparation method therefor are currently highly desired.

BRIEF SUMMARY OF THE DISCLOSURE

The objective of the present disclosure is to provide a ceramic, a method for preparing a ceramic, and a ceramic prepared by using the method to overcome the drawbacks of low toughness, low break resistance, and low blackness of the zirconia ceramic in the prior art.

During research, inventors of the present disclosure discovered that the ceramic included a zirconia matrix and black particles dispersed inside and on an outer surface of the zirconia matrix. The black particles is an oxide including elements A and B. When A is selected from at least one of Ca, Sr, Ba, Y, and La, and B is selected from at least one of Cr, Mn, Fe, Co, and Ni, the ceramic may simultaneously have excellent properties of high toughness, high break resistance, and high blackness.

Thus, in order to achieve the aforementioned objective, on one hand, the present disclosure provides a ceramic, and the ceramic includes a zirconia matrix and an additive dispersed inside and on an outer surface of the zirconia matrix. The additive may be an oxide including elements A and B, where A is selected from at least one of Ca, Sr, Ba, Y, and La, and B is selected from at least one of Cr, Mn, Fe, Co, and Ni.

On the other hand, the present disclosure further provides a method for preparing the ceramic. The method includes the following steps: (1) mixing zirconia, an additive and an organic solvent, and adding a binding agent into an obtained mixture, thereby obtaining a mixed slurry; (2) performing a drying process on the mixed slurry to obtain a spherical powder; and (3) performing molding and sintering processes on the spherical powder to obtain the ceramic. More specifically, the additive is an oxide including elements A and B, where A is selected from at least one of Ca, Sr, Ba, Y, and La, and B is selected from at least one of Cr, Mn, Fe, Co, and Ni.

In a third aspect, the present disclosure further provides a ceramic prepared by the aforementioned method.

In the ceramic and the method for preparing the ceramic according to embodiments of the present disclosure, the oxide including the elements A and B are added into the zirconia matrix as the additive, where A is selected from at least one of Ca, Sr, Ba, Y, and La, and B is selected from at least one of Cr, Mn, Fe, Co, and Ni. Accordingly, during sintering, a black particle substance is formed in the ceramic, and the black particles may be uniformly dispersed inside and on the outer surface of the ceramic, thereby increasing the blackness of the ceramic and preventing the propagation of cracks, such that the break resistance of the ceramic is improved. Accordingly, the ceramic of the present disclosure simultaneously has excellent properties of high toughness, high break resistance, and high blackness.

Other features and advantages of the present disclosure will be described in detail hereinafter in the following specific implementation methods.

DETAILED DESCRIPTION

Figure 1:
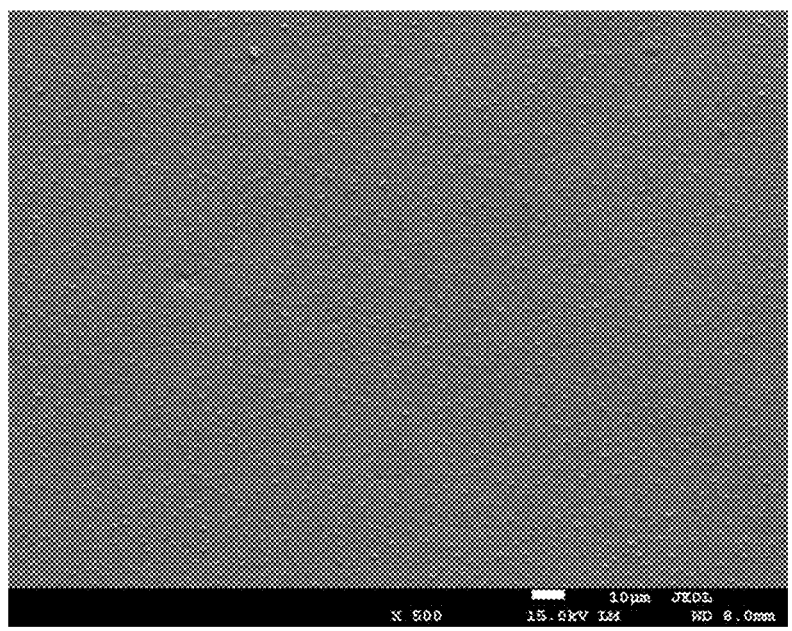
FIG. 1 is an electron microscopic image of a surface of a ceramic prepared in embodiment 1.

Specific implementations of the present disclosure are described more fully hereinafter. It should be understood that specific implementations described herein are only used for describing and explaining the present disclosure, rather than limiting the present disclosure.

According to one aspect of the present disclosure, the present disclosure provides a ceramic. According to embodiments of the present disclosure, the ceramic includes: a zirconia matrix, and an additive dispersed inside and on an outer surface of the zirconia matrix. The additive may be an oxide including elements A and B, where A is selected from at least one of Ca, Sr, Ba, Y, and La, and B is selected from at least one of Cr, Mn, Fe, Co, and Ni. In other words, the ceramic includes a zirconia matrix and black particles dispersed inside and on the outer surface of the zirconia matrix, and the black particles may be an oxide including elements A and B, where A is selected from at least one of Ca, Sr, Ba, Y, and La, and B is selected from at least one of Cr, Mn, Fe, Co, and Ni.

As long as the ceramic according to embodiments of the present disclosure includes the zirconia matrix and the aforementioned additive (i.e., the black particles), the toughness, the break resistance, and the blackness of the ceramic may be improved simultaneously. In order to further improve the toughness, the break resistance, and the blackness of the ceramic, preferably, a chemical structure of the aforementioned additive is $A_xB_yO_z$, where x, y and z are atomic percentages, and x is approximately 0.5 to 2, y is approximately 0.5 to 2, and z is approximately 3 to 5.

According to embodiments of the present disclosure, any size of the black particles, or namely the additive, is appropriate as long as the appearance of the ceramic is not affected. To further improve the toughness, the break resistance, and the blackness of the ceramic, preferably, the average particle size of the black particles or namely the additive may be approximately 0.5 to 10 micrometers. More preferably, the average particle size of the black particles or namely the additive may be approximately 1 to 7 micrometers.

Those skilled in the relevant art should understand that the ceramic according to embodiments of the present disclosure may further include a sintering aid. The type of the sintering aid is not particularly limited, and the sintering aid may be a conventional sintering aid in the relevant art for preparing the ceramic. Preferably, the sintering aid may be at least one of $Ta_2O_5$, $Nb_2O_5$, CuO, ZnO, and $TiO_2$. As such, the toughness, the break resistance, and the blackness of the ceramic may be further improved.

Contents of the zirconia, the additive, and the sintering aid in the ceramic according to embodiments of the present disclosure may be contents used in the conventional ceramic in the relevant art. Preferably, based on the total weight of the zirconia, the content of the additive may be approximately 1 to 10 weight %, and the content of the sintering aid may be 0.1 to 5 weight %. Accordingly, the toughness, the break resistance, and the blackness of the ceramic may be further improved. The toughness of the ceramic according to embodiments of the present disclosure may be approximately 10 to 12 MPa $m^{1/2}$, and the number of break-resistance times of the ceramic may be approximately 10 to 15.

According to embodiments of the present disclosure, a red-green value a of the ceramic may be 0.06 to 0.07, a blue-yellow value b may be −0.02 to −0.03, and an intensity L of the surface reflection light may be 42 to 44.

It should be noted that, a ceramic sample (or called a standard ceramic sample) with chromaticity satisfying the usage requirement of the exterior part may be prepared via a carbon blackening method. More specifically, a white ceramic sample may be embedded in carbon and sintered at a temperature of approximately 1300 centigrade degrees, such that the aforementioned standard ceramic sample is obtained. Upon examination, the red-green value a of the aforementioned standard ceramic sample is 0.08, the blue-yellow value b is −0.04, and the intensity L of the surface reflection light is 44. By comparison, the values of L, a, and b of the ceramic according to embodiment of the present disclosure are found to be almost the same as that of the standard ceramic sample, indicating that the ceramic according to embodiment of the present disclosure meets the usage requirement as an exterior part.

Those skilled in the relevant art should understand that the zirconia is not particularly limited, and for example, the zirconia may be the conventional yttrium-stabilized tetragonal zirconia in the relevant art for preparing a zirconia ceramic.

According to another aspect of the present disclosure, the present disclosure further provides a method for preparing a ceramic. According to embodiment of the present disclosure, the method includes the following steps.

(1) Zirconia, an additive and an organic solvent are mixed, and a binding agent is added into an obtained mixture to obtain a mixed slurry.

According to embodiment of the present disclosure, the additive may be an oxide including elements A and B, where A is selected from at least one of Ca, Sr, Ba, Y, and La, and B is selected from at least one of Cr, Mn, Fe, Co, and Ni. According to embodiments of the present disclosure, the additive may be dispersed in the zirconia matrix in a form of black particles. In the method for preparing a ceramic according to embodiments of the present disclosure, by adding the aforementioned additive, the toughness, the break resistance, and the blackness of the ceramic may be simultaneously improved. In some embodiments of the present disclosure, to further improve the toughness, the break resistance, and the blackness of the ceramic, preferably, a chemical structure of the additive (i.e., the oxide) may be $A_xB_yO_z$, where x, y and z are atomic percentages, x is 0.5~2, y is 0.5~2, and z is 3~5.

According to embodiments of the present disclosure, a method for preparing the additive may be a conventional preparation method in the relevant art. In embodiments of the present disclosure, to further improve the toughness, the break resistance, and the blackness of the ceramic, preferably, the method for preparing the additive includes the following steps: mixing at least one of oxides, carbonates, nitrates, and oxalates comprising the element A with at least one of oxides, carbonates, nitrates, and oxalates comprising the element B, and sintering an obtained mixture at 900° C.~1350° C. More preferably, the sintering time is 2 to 5 hours.

According to embodiments of the present disclosure, no special requirement is proposed for the type and uasage amount of the organic solvent. For example, the type of the organic solvent may be at least one of ethanol, acetone, or water, and with respect to 100 parts by weight of a zirconia matrix material, the usage amount of the organic solvent may be 50 to 80 parts by weight.

According to embodiments of the present disclosure, the binding agent may be selected from at least one of polyvinyl alcohol or polyethylene glycol 4000. In order to better bind raw materials configured to prepare the ceramic, preferably, the binding agent may be a mixture of polyvinyl alcohol and polyethylene glycol 4000, and a molar ratio of polyvinyl alcohol to polyethylene glycol 4000 may be preferably 1:1~2.

It should be noted that, in the subsequent sintering treatment, the binding agent may volatilize due to the excessively high temperature. Accordingly, the prepared ceramic includes no binding agent.

According to embodiments of the present disclosure, in step (1), the ceramic raw material including the zirconia and the additive may be uniformly mixed with the sintering aid in the organic solvent, and then the binding agent is added and uniformly mixed to obtain the mixed slurry. According to embodiments of the present disclosure, the sintering aid may be a conventional sintering aid in the relevant art for preparing a ceramic. To further lower the sintering temperature and further enhance the densification of the ceramic to enable the prepared ceramic to have higher toughness, higher break resistance, and enhanced blackness, preferably, the sintering aid may be selected from at least one of $Ta_2O_5$, $Nb_2O_5$, CuO, ZnO, and $TiO_2$.

In a preferred implementation method of the present disclosure, the method further includes that in step (1), after the ceramic raw materials including the zirconia and the additive are uniformly mixed with the sintering aid in the organic solvent and before the binding agent is added and uniformly mixed, adding a dispersing agent. Accordingly, the zirconia, the additive, and the sintering aid may be mixed more sufficiently, thereby facilitating the formation of the black particles in the ceramic. Accordingly, an internal structure and appearance color of the finally prepared ceramic become more uniform, and the toughness and the break resistance of each portion of the ceramic also become more consistent.

According to embodiments of the present disclosure, no special requirement is proposed for the type and usage amount of the dispersing agent. For example, the type of the dispersing agent may be at least one of hydroxypropyl methylcellulose, sodium carboxymethylcellulose, or triethanolamine, and with respect to 100 parts by weight of the zirconia matrix material, the usage amount of the dispersing agent may be 1 to 2 parts by weight.

According to embodiments of the present disclosure, in step (1), to better utilize the good performance of the zirconia matrix material itself, and to further improve the toughness, the break resistance, and the blackness of the ceramic, preferably, based on the total weight of the zirconia, the usage amount of the additive is 1 to 10 weight %, the usage amount of the sintering aid is 0.1 to 5 weight %, and the usage amount of the binding agent is 0.5 to 1.5 weight %.

According to embodiments of the present disclosure, in step (1), no special requirement is proposed for the mixing method, as long as the mixing is uniform. For example, the mixing method may be ball milling, the period of ball milling is preferably 4 to 8 hours, and the ball milling is preferably carried out in a ball milling tank.

(2) The mixed slurry is dried to obtain a spherical powder. In other words, the mixed slurry obtained in step (1) is dried to remove the organic solvent to obtain the spherical powder.

According to embodiments of the present disclosure, in step (2), the drying may be performed in a conventional drying manner. Preferably, the drying may be spray-drying; and by means of the spray-drying, the spherical powder with relatively high mobility may be formed, thereby facilitating the subsequent molding. The spray-drying may be carried out in a conventional spray tower.

(3) The spherical powder is molded and sintered to obtain the ceramic. In other words, the spherical powder obtained in step (2) is molded and then sintered to obtain the ceramic.

According to embodiments of the present disclosure, in step (3), the molding may be a conventional molding process in the relevant art. For example, the molding may be one of dry-pressing molding, isostatic pressing molding, injection molding, and hot pressing casting molding. Preferably, the dry-pressing molding is used. When the molding process is the dry-pressing molding, parameters of the dry-pressing molding may be conventional parameters in the relevant art, for example, the parameters may include a pressing machine with a tonnage of 180 tons and an oil pressure of 6 MPa.

According to the preparation method illustrated in the present disclosure, a sintering procedure in step (3) may be a conventional sintering procedure in the relevant art. For example, the sintering procedure may be as follows: the spherical powder is heated to 500° C.~700° C. from a room temperature in 5 to 7 hours and thermally preserved for 1~2 hours, 500° C. 700° C. is increased to 900° C.~1100° C. in 5 to 7 hours and thermally preserved for 1 to 2 hours, 900° C.~1100° C. is increased to 1200° C. in 0.5 to 2 hours and thermally preserved for 1 to 2 hours. Further, 1200° is increased to 1350° C.~1450° C. in 2 to 5 hours and thermally preserved for 3 to 4 hours, then the powder is cooled to 900° C. in 2 to 5 hours, and is finally naturally cooled down to the room temperature.

The method for preparing the ceramic according to embodiments of the present disclosure may further include polishing the obtained ceramic, thereby obtaining a ceramic material with a bright appearance.

According to a third aspect of the present disclosure, the present disclosure further provides a ceramic prepared by using the aforementioned method.

In the present disclosure, the disclosed method is used to prepare a ceramic, thereby improving the toughness, the break resistance, and the blackness of the ceramic simultaneously. For example, the toughness of the prepared ceramic may reach up to 10 to 12 MPa $m^{1/2}$, the number of break-resistance times can reach up to 10 to 15; the blackness of the prepared ceramic may also be improved. For example, with respect to the standard ceramic sample with the red-green value a of 0.08, the blue-yellow value b of −0.04 and the surface reflection light intensity L of 44, the red-green value a of the prepared ceramic may be 0.06 to 0.07, the blue-yellow value b may be −0.02 to −0.03, and the surface reflection light intensity L may be 42 to 44.

In the present disclosure, a toughness test is carried out according to GBT23806, and the blackness is measured by a colorimeter.

EMBODIMENTS

In the following embodiments and comparative example, zirconia is purchased from Guangdong Orient Zirconic Ind Sci & Tech Co., Ltd.

A model of a colorimeter is SP64 produced by American X-Rite.

A model of an electron microscope is a JSM-7600F scanning electron microscope, and a model of an X-ray spectrometer is SmartLab.

Embodiment 1

This embodiment is used for describing the ceramic of the present disclosure and the preparation method therefor.

(1) Preparation of the additive: SrO, $La_2O_3$ and $MnO_2$ are uniformly mixed according to a weight ratio of 1:1:1, the obtained mixture is dried and thermally preserved for 2 h at 900° C., and then the mixture is ball-milled and crushed to a micrometer scale to obtain the additive. According to the usage amounts of elements, the additive is calculated to be an oxide of $Sr_1La_{0.5}Mn_1O_3$.

Figure 2:
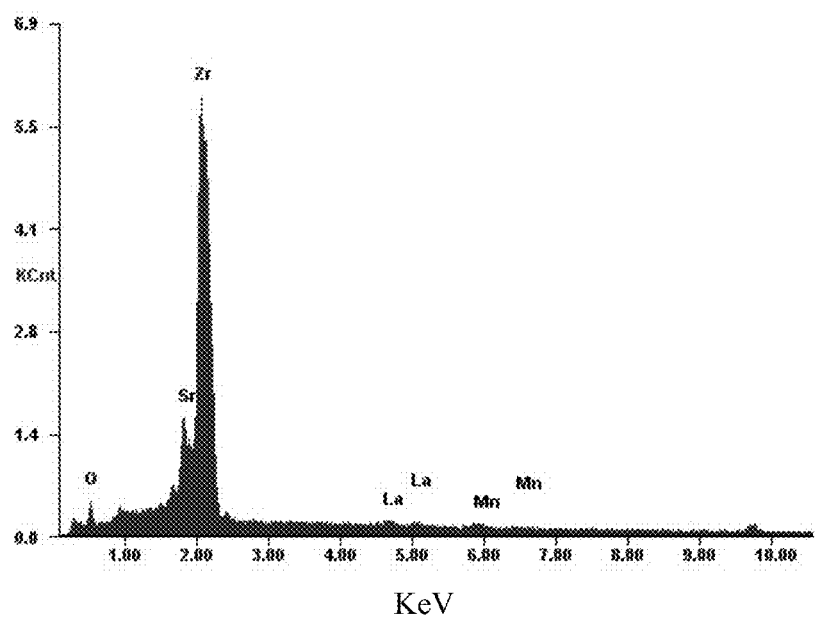
FIG. 2 is a measured energy-dispersive X-ray spectroscopic graph of black particles in the ceramic prepared in embodiment 1.

(2) Ceramic raw materials (200 g zirconia and 10 g additive) and 10 g $Ta_2O_5$ are ball-milled for 4 hours in 120 mL ethanol to be uniformly mixed, then 4 g hydroxypropyl methylcellulose is added. Further, 3 g mixture of polyethylene glycol 4000 and polyvinyl alcohol (a mass ratio of 1:1) is added and ball-milled for half an hour to obtain a mixed slurry. Further, the mixed slurry is sent into a spray tower for spray drying until all the mixed slurry is dried into spherical powder. Then, the spherical powder is dry pressed using a pressing machine with a tonnage of 180 tons under the parameter condition where an oil pressure of 6 MPa is used. Further, the spherical powder is sintered by a following sintering procedure and ground and polished to obtain a ceramic sample, then the ceramic sample is cut by laser to obtain a sample plate A1, where the thickness of the sample plate is 0.8 mm. Using the electron microscope, black particles are observed and found to be attached on the surface of the ceramic (an electron microscopic image of the sample plate A1 is shown in FIG. 1). The average particle size of the black particles is 1 micrometer, an elementary composition of the black particles is measured using the X-ray spectrometer, and a measuring result of the X-ray spectrometer is shown in FIG. 2.

The sintering procedure: the spherical powder is heated from a room temperature to 600° C. in 5 hours and thermally preserved for 2 hours, 600° C. is increased to 1100° C. in 5 hours and thermally preserved for 2 hours, 1100° C. is increased to 1200° C. in 0.5 hour and thermally preserved for 2 hours, and 1200° C. is increased to 1400° C. in 2 hours and thermally preserved for 3 hours. Then the powder is cooled to 900° C. in 2 hours, and is finally naturally cooled to the room temperature.

Embodiment 2

This embodiment is used for describing the ceramic of the present disclosure and the preparation method therefor.

(1) Preparation of the additive: $Y_2O_3$, CaO and CoO are uniformly mixed according to a weight ratio of 1:1:2, the obtained mixture is dried and thermally preserved at 1200° C. for 1.5 h, and then the mixture is ball-milled and crushed to a micrometer scale to obtain the additive. Further, according to the usage amounts of elements, the additive is calculated to be an oxide of $Ca_{1.5}Y_{0.5}Co_{0.5}O_3$.

(2) Ceramic raw materials (200 g zirconia and 8 g additive) and 10 g ZnO are ball-milled for 7 hours in 100 mL of ethanol to be uniformly mixed, then 2 g triethanolamine is added, and 3 g of a mixture of polyethylene glycol 4000 and polyvinyl alcohol (a mass ratio of 1:1.5) is added and ball-milling is continued for half an hour to obtain a mixed slurry. Then the mixed slurry is sent into the spray tower for spray drying until all the mixed slurry is dried into spherical powder. Further, the spherical powder is dry pressed using a pressing machine with a tonnage of 180 tons under the parameter condition where an oil pressure of 6 MPa is used. Further, the spherical powder is sintered by a following sintering procedure and ground and polished to obtain a ceramic sample. The ceramic sample is then cut by laser to obtain a sample plate A2, where the thickness of the sample plate is 0.8 mm. Under the electron microscope, black particles are observed and found to be attached on the surface of the ceramic, and the average particle size of the black particles is measured to be 5 micrometers.

The sintering procedure: the spherical powder is heated from a room temperature to 500° C. in 7 hours and then thermally preserved for 2 hours, 500° C. is increased to 900° C. in 7 hours and thermally preserved for 2 hours, 900° C. is increased to 1200° C. in 2 hours and thermally preserved for 1 hour, and 1200° C. is increased to 1450° C. in 5 hours and thermally preserved for 3.5 hours. Further, the powder is cooled to 900° C. in 4 hours, and finally naturally cooled to the room temperature.

Embodiment 3

This embodiment is used for describing the ceramic of the present disclosure and the preparation method therefor.

(1) Preparation of the additive: SrO, BaO, $MnO_2$ and $Fe_2O_3$ are uniformly mixed according to a weight ratio of 1:1.3:1:0.5, an obtained mixture is dried and thermally preserved for 4 h at 1500° C., and then the mixture is ball-milled and crushed to a micrometer scale to obtain the additive. According to the usage amounts of elements, the additive is calculated to be oxide of $Sr_1Ba_{0.5}Fe_{0.5}Mn_{0.5}O_3$.

(2) Ceramic raw materials (200 g zirconia and 2 g additive) and 10 g $Ta_2O_5$ are ball-milled for 6 hours in 160 mL of ethanol to be uniformly mixed, then 2 g sodium carboxymethylcellulose is added, and 3 g of a mixture of polyethylene glycol 4000 and polyvinyl alcohol (a mass ratio of 1:2) is added and ball-milling is continued for half an hour to obtain a mixed slurry. The mixed slurry is then sent into the spray tower for spray drying until all the mixed slurry is dried into spherical powder, and the spherical powder is dry pressed using a pressing machine with a tonnage of 180 tons under the parameter condition where an oil pressure of 6 MPa is used. Further, the spherical powder is sintered by a following sintering procedure and ground and polished to obtain a ceramic sample, the ceramic sample is then cut by laser to obtain a sample plate A3, where the thickness of the sample plate is 0.8 mm. Under the electron microscope, black particles are observed and found to be attached on the surface of the ceramic, and the average particle size of the black particles is measured to be 7 micrometers.

The sintering procedure: the spherical powder is heated from a room temperature to 700° C. in 6 hours and then thermally preserved for 1 hour, 700° C. is increased to 1100° C. in 6 hours and thermally preserved for 1 hour, 1100° C. is increased to 1200° C. in 2 hours and thermally preserved for 2 hours, and 1200° C. is increased to 1450° C. in 4 hours and thermally preserved for 4 hours. Further, the powder is cooled to 900° C. in 4 hours, and finally naturally cooled to the room temperature.

Comparative Example 1

Figure 3:
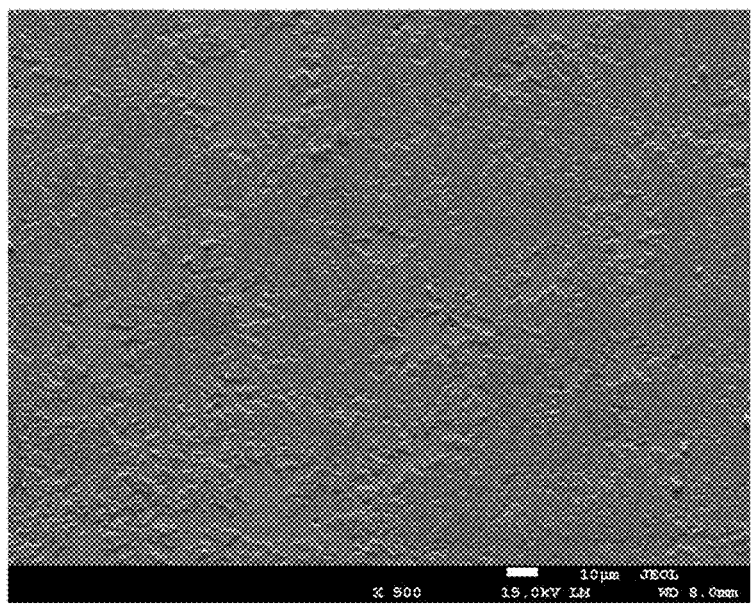
FIG. 3 is an electron microscopic image of a surface of a ceramic prepared in comparative example 1.

A ceramic is prepared according to the method of embodiment 1, and the difference is that the additive in embodiment 1 is replaced with $Ta_2O_5$. A sample plate D1 is finally prepared; and under the electron microscope, no black particle is observed to be formed on the surface of the ceramic. An electron microscopic image of the sample plate D1 is shown in FIG. 3.

Test of Examples

The toughness of the sample plates A1~A3 and D1 is separately tested according to a breaking toughness test standard of GBT23806, and test results are shown in Table 2.

Figure 4:
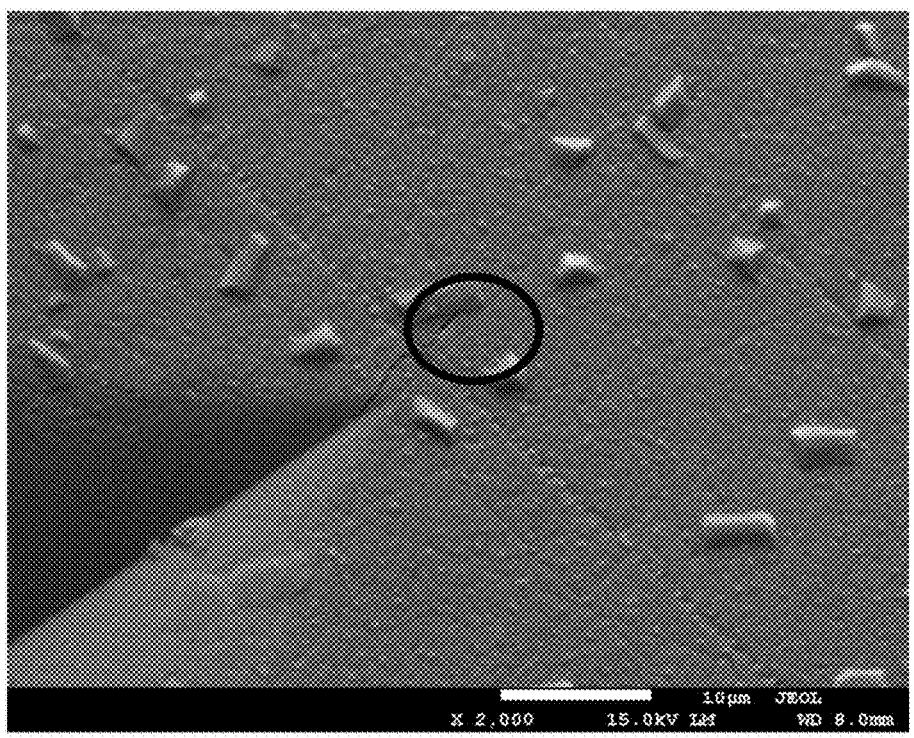
FIG. 4 is an electron microscopic image of a ceramic surface of a sample plate A1 after the ceramic surface continuously contacts a ground for three times.

Break resistance test: four groups of sample plates A1~A3 and D1 (the length and width are the same as that of a rear shell of iPhone 4s, and the thickness is 0.8 mm) (the number of the sample plates in each group is 10) fall, respectively, in a free fall style, and the initial falling height is 1.3 m. After falling, a surface of the sample plate with a large surface area contacts a ceramic tile floor. The number of break-resistance times of each group of sample plates is an average number of the break-resistance times of the 10 sample plates in the same group, where the test can be stopped as long as the sample plate is completely broken, and regardless of the size of a crack, test results are shown in table 2. Further, by using the break-resistance testing method, the sample plate A1 is selected to continuously contact the floor for 3 times, the surface of the sample plate is observed via the electron microscope, and an electron microscopic image is shown in FIG. 4.

The blackness of a standard sample and the sample plates A1 to A3 and D1 is respectively tested using the colorimeter, and test results are illustrated in Table 3.

TABLE 2

| Sample plate | Toughness (MPa m$^{1/2}$) | Break-resistance times (#) |
|---|---|---|
| A1 | 12 | 15 |
| A2 | 10 | 10 |
| A3 | 12 | 13 |
| D1 | 2 | 2 |

TABLE 3

| | Sample plate | | |
|---|---|---|---|
| | L | a | b |
| Standard sample | 44 | 0.08 | −0.04 |
| A1 | 42 | 0.06 | −0.02 |
| A2 | 43 | 0.06 | −0.03 |
| A3 | 44 | 0.07 | −0.03 |
| D1 | When the color is observed to be brown by eyes, the test is no longer needed. | | |

Note:
L is the intensity of the surface reflection light of the sample, a is the red-green value (a positive value indicates slight red, and a negative value indicates slight green), and b is the blue-yellow value (a positive value indicates slight yellow, and a negative value indicates slight blue).

Embodiments 1~3 are compared to the comparative example 1, and referring to FIG. 1 to FIG. 3, the black particles are observed and found to be attached on the surface of the ceramic in the electron microscopic image. However, no black particle exists on the surface of the ceramic as shown in FIG. 3. Thus, due to the formation of black particles, the ceramic prepared by using the disclosed method has relatively high toughness, relatively high blackness, and higher break resistance.

Further, as shown in FIG. 4, the black particles may prevent the propagation of the cracks during the break resistance test, such that the break resistance of the ceramic may be remarkably enhanced.

In the preparation method of the disclosed ceramic, because the aforementioned additive of the oxide including the elements A and B are added into the zirconia matrix, where A is selected from at least one of Ca, Sr, Ba, Y, and La, and B is selected from at least one of Cr, Mn, Fe, Co, and Ni, a black particle substance may be formed in the ceramic during sintering. The black particles are uniformly dispersed inside and on the outer surface of the ceramic, thereby increasing the blackness of the ceramic and preventing the propagation of the cracks, such that the break resistance of the ceramic is enhanced. Accordingly, the ceramic of the present disclosure simultaneously has excellent properties of high toughness, break resistance, and high blackness.

The foregoing describes preferred implementation methods of the present disclosure in detail; however, the present disclosure is not limited to the details in the aforementioned implementation methods. Without departing from the technical concept scope of the present disclosure, various simple modifications can be made to the technical solutions of the present disclosure, and all these simple modifications shall fall within the protection scope of the present disclosure.

Further, it should be noted that various specific technical features described in the aforementioned specific implementations can be combined in any appropriate manner when there is no conflict. To avoid the unnecessary repetition, various possible combination forms are not described herein.

Further, any combination of various different implementation methods of the present disclosure may also be carried out as, without departing from the idea of the present disclosure, such combination shall be treated as the a part of the present disclosure.

What is claimed is:

1. A ceramic, comprising:
    a zirconia matrix; and
    an additive, the additive being dispersed inside and on an outer surface of the zirconia matrix, and the additive being an oxide comprising elements A and B;
    wherein A is selected from at least one of Ca, Sr, Ba, Y, and La, and B is selected from at least one of Co, and Ni.

2. The ceramic according to claim 1, wherein a chemical composition of the additive is AxByOz, x, y and z are atomic percentages, and x is 0.5 to 2, y is 0.5 to 2, and z is 3 to 5.

3. The ceramic according to claim 1, wherein an average particle size of the additive is 0.5 to 10 micrometers.

4. The ceramic according to claim 3, wherein the average particle size of the additive is 1 to 7 micrometers.

5. The ceramic according to claim 1, further comprising:
    a sintering aid, wherein the sintering aid is selected from at least one of $Ta_2O_5$, $Nb_2O_5$, CuO, ZnO, and $TiO_2$.

6. The ceramic according to claim 5, wherein based on a total weight of the zirconia matrix, a content of the sintering aid is 0.1 to 5 weight %.

7. The ceramic according to claim 1, wherein based on the total weight of the zirconia matrix, a content of the additive is 1 to 10 weight %.

8. The ceramic according to claim 1, wherein toughness of the ceramic is 10 to 12 MPa m$^{1/2}$.

9. The ceramic according to claim 1, wherein a red-green value a of the ceramic is 0.06 to 0.07, a blue-yellow value b is −0.02 to −0.03, and an intensity L of surface reflection light is 42 to 44.

* * * * *